US008044958B2

(12) United States Patent
Shinohara et al.

(10) Patent No.: US 8,044,958 B2

(45) Date of Patent: Oct. 25, 2011

(54) MATERIAL CREATION SUPPORT DEVICE, MATERIAL CREATION SUPPORT SYSTEM, AND PROGRAM

(75) Inventors: Noboru Shinohara, Tokyo (JP); Naohito Doi, Tokyo (JP); Yoshimori Rikukawa, Tokyo (JP)

(73) Assignee: I-N Information Systems, Ltd., Tokyo (JP)

( * ) Notice: Subject to any disclaimer, the term of this patent is extended or adjusted under 35 U.S.C. 154(b) by 938 days.

(21) Appl. No.: 11/997,471

(22) PCT Filed: Nov. 28, 2005

(86) PCT No.: PCT/JP2005/021773

§ 371 (c)(1), (2), (4) Date: Jan. 31, 2008

(87) PCT Pub. No.: WO2007/015316

PCT Pub. Date: Feb. 8, 2007

(65) Prior Publication Data

US 2010/0091022 A1 Apr. 15, 2010

(30) Foreign Application Priority Data

Aug. 1, 2005 (JP) ................................ 2005-223439

(51) Int. Cl.
*G06T 11/20* (2006.01)

(52) U.S. Cl. ....................................................... 345/440

(58) Field of Classification Search ................... 345/440
See application file for complete search history.

(56) References Cited

U.S. PATENT DOCUMENTS

| | | | | |
|---|---|---|---|---|
| 5,412,769 | A * | 5/1995 | Maruoka et al. | 345/440 |
| 6,553,419 | B1 * | 4/2003 | Ram | 709/224 |
| 6,760,676 | B2 * | 7/2004 | Nygaard, Jr. | 702/79 |
| 6,973,396 | B1 * | 12/2005 | Shah et al. | 702/81 |
| 7,461,023 | B1 * | 12/2008 | Helweg | 705/37 |
| 7,711,654 | B2 * | 5/2010 | Schmidtberg et al. | 705/333 |
| 7,904,319 | B1 * | 3/2011 | Whear et al. | 705/4 |
| 2002/0070953 | A1 * | 6/2002 | Barg et al. | 345/700 |
| 2002/0169658 | A1 * | 11/2002 | Adler | 705/10 |
| 2004/0024547 | A1 * | 2/2004 | Nygaard, Jr. | 702/67 |
| 2004/0090629 | A1 * | 5/2004 | Drege et al. | 356/445 |
| 2004/0168115 | A1 * | 8/2004 | Bauernschmidt et al. | 715/500 |
| 2005/0055257 | A1 * | 3/2005 | Senturk et al. | 705/8 |
| 2005/0055287 | A1 * | 3/2005 | Schmidtberg et al. | 705/28 |

(Continued)

FOREIGN PATENT DOCUMENTS

JP 5-204982 8/1993

(Continued)

OTHER PUBLICATIONS

English language International Search Report (PCT/ISA/210) mailed on Dec. 20, 2005 in connection with International Application No. PCT/JP2005/021773.

(Continued)

*Primary Examiner* — Javid Amini

(74) *Attorney, Agent, or Firm* — Staas & Halsey LLP

(57) ABSTRACT

When a position on a displayed graph is selected, a graph information processor acquires time information which is a parameter on an axis at the selected position. A character information acquirer acquires character information that includes date/time information as one of the attributes that matches the acquired time information. The acquired character information is displayed.

7 Claims, 10 Drawing Sheets

U.S. PATENT DOCUMENTS

2005/0267702 A1* 12/2005 Shah et al. ...................... 702/81
2005/0267721 A1* 12/2005 Thalhammer-reyero ....... 703/11
2005/0273305 A1* 12/2005 Thalhammer-Reyero ...... 703/11
2006/0015016 A1* 1/2006 Thornton ...................... 600/300
2006/0059238 A1* 3/2006 Slater et al. ................... 709/206
2006/0294065 A1* 12/2006 Dettinger et al. ................. 707/3
2010/0091022 A1* 4/2010 Shinohara et al. ............ 345/440

FOREIGN PATENT DOCUMENTS

JP 8-180037 7/1996
JP 10-320469 12/1998
JP 2000-322439 11/2000
JP 2003-108785 4/2003

OTHER PUBLICATIONS

International Preliminary Report on Patentability, mailed Feb. 14, 2008 and issued in corresponding International Patent Application No. PCT/JP2005/021773.

* cited by examiner

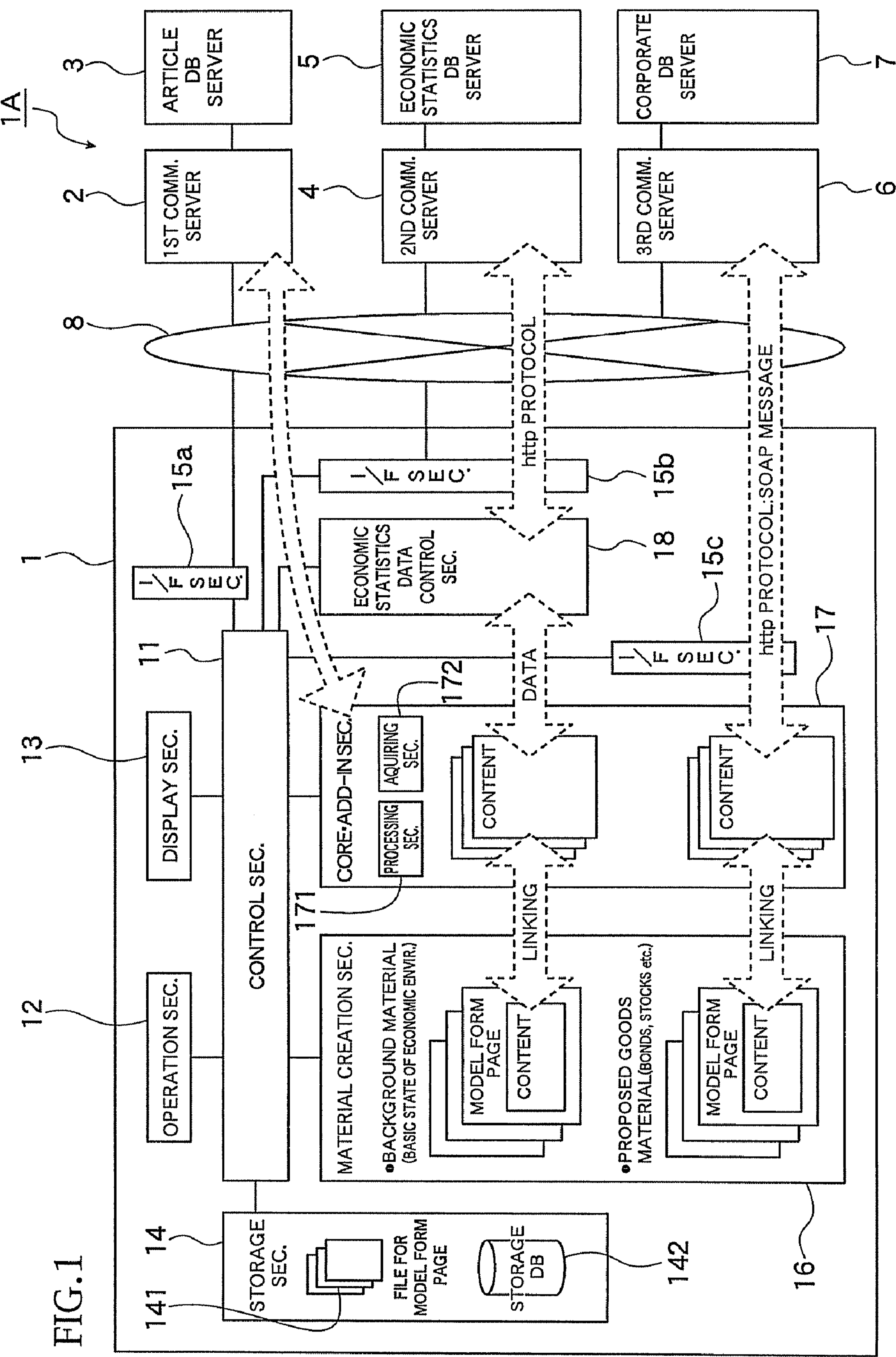
FIG. 1
1A
1
ARTICLE DB SERVER
ECONOMIC STATISTICS DB SERVER
CORPORATE DB SERVER
1ST COMM. SERVER
2ND COMM. SERVER
3RD COMM. SERVER
http PROTOCOL
http PROTOCOL:SOAP MESSAGE
I/F SEC.
ECONOMIC STATISTICS DATA CONTROL SEC.
DATA
DISPLAY SEC.
OPERATION SEC.
CONTROL SEC.
CORE•ADD-IN SEC.
AQUIRING SEC.
PROCESSING SEC.
CONTENT
LINKING
MATERIAL CREATION SEC.
•BACKGROUND MATERIAL (BASIC STATE OF ECONOMIC ENVIR.)
•PROPOSED GOODS MATERIAL(BONDS, STOCKS etc.)
MODEL FORM PAGE
STORAGE SEC.
FILE FOR MODEL FORM PAGE
STORAGE DB
2
3
4
5
6
7
8
11
12
13
14
141
142
15a
15b
15c
16
17
171
172
18

| | Year/month/Day (33) | Category (34) | Keyword (35) | Title (32) | Article body (37) |
|---|---|---|---|---|---|
| 36a | 2005/05/21 | Politics, economy | FTA, Malaysia, Cabinet Minister | Conclusion of FTA basically agreed = Japan, Malaysia ministerial meeting | Nakagawa METI minister said that... |
| 36b | 2005/05/21 | Politics, economy | Japan-S.Korea, Summit, N. Korea, Nuclear | Japan-S.Korea summit meeting to be held on June 20th N.Korean's nuclear issue will be discussed. | Diplomatic source revealed on 20th... |
| 36c | 2005/05/21 | Politics, economy | Schroeder, Germany, Election | Schroeder administration is in clutch in Germany, ruling party is cornered by the provincial election | The most populated region in Germany |
| ..... | 2005/05/21 | Overseas, economy | Chinese Yuan, Revalue, Greenspan | "Rrevaluation of Chinese yuan will not decrease the deficit" Greenspan says | Federal Reserve Officials... |
| | 2005/05/21 | Overseas, politics | Leader, Liberation, Uzbeg | Daily demonstrations demanding an acquittal of their leaders, at the border town Kara in Uzbeg | [Vyskeku May 21 (Kyodo)]... |
| | 2005/05/21 | Domestic, economy | Public Investment, Budget, Finance Ministry | Public investment will be reduced for 7 consecutive years, MOF policy for 2006 budget | The MOF said on May 21st, the 2006 year budget... |
| | 2005/05/21 | Domestic, economy | Deflation, Growing-Rate | Deflation will be over, a private research institute reviews growing rate for 2006 | GDP for the year of 2004... |
| | 2005/05/21 | Domestic, politics | Road Corporation, Privatize, Higashi Nihon | Mr. Inoue becomes the leader of the privatized Higashi Nihon Road Corporation, 5 corporations-one institute | Four privatized road-related corporations... |
| | 2005/05/21 | Domestic, economy | Quantitative Easing, Bank of Japan | Quantitative easing policy will be maintained, Bank of Japan governor emphasized. | Fukui Toshihiko, Governor of the Bank of Japan said... |
| | 2005/05/21 | Domestic, incident | Billing fraud, Human Right | Billing frauds are rapidly increasing, human right violations in the prefecture | Morioka District Legal Affairs Bureau (Saga... |
| | 2005/06/08 | Overseas, economy | Stocks, Financial Policy, Overseas, Market | "Stock" is in a sluggish pace due to remarks about the financial policy / Overseas market trends | [Tokyo June 8 (Reuters)] Stocks... |
| | ..... | ..... | ..... | ..... | ..... |

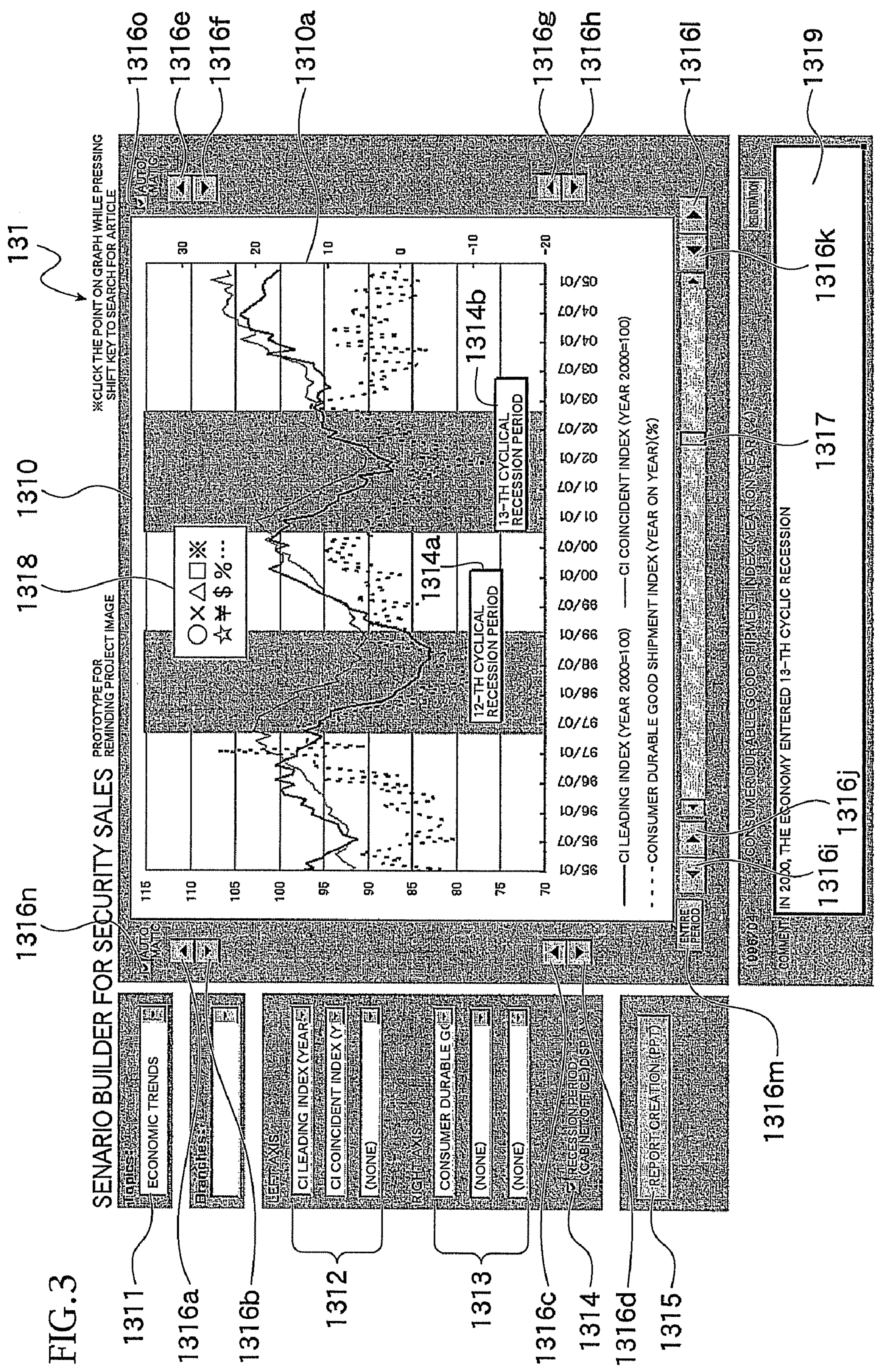
FIG.3
131
SENARIO BUILDER FOR SECURITY SALES
PROTOTYPE FOR REMINDING PROJECT IMAGE
※CLICK THE POINT ON GRAPH WHILE PRESSING SHIFT KEY TO SEARCH FOR ARTICLE
Topics
ECONOMIC TRENDS
Branches
LEFT AXIS
CI LEADING INDEX (YEAR
CI COINCIDENT INDEX (Y
(NONE)
RIGHT AXIS
CONSUMER DURABLE G
(NONE)
(NONE)
RECESSION PERIOD (CABINET OFFICE DISPLAY)
REPORT CREATION (PPT)
AUTOMATIC
12-TH CYCLICAL RECESSION PERIOD
13-TH CYCLICAL RECESSION PERIOD
○×△□※
☆¥$%…
CI LEADING INDEX (YEAR 2000=100)
CI COINCIDENT INDEX (YEAR 2000=100)
CONSUMER DURABLE GOOD SHIPMENT INDEX (YEAR ON YEAR)(%)
ENTIRE PERIOD
CONSUMER DURABLE GOOD SHIPMENT INDEX (YEAR ON YEAR)(%)
COMMENT
IN 2000, THE ECONOMY ENTERED 13-TH CYCLIC RECESSION
REGISTRATION
1310
1310a
1311
1312
1313
1314
1314a
1314b
1315
1316a
1316b
1316c
1316d
1316e
1316f
1316g
1316h
1316i
1316j
1316k
1316l
1316m
1316n
1316o
1317
1318
1319

Figure 5:
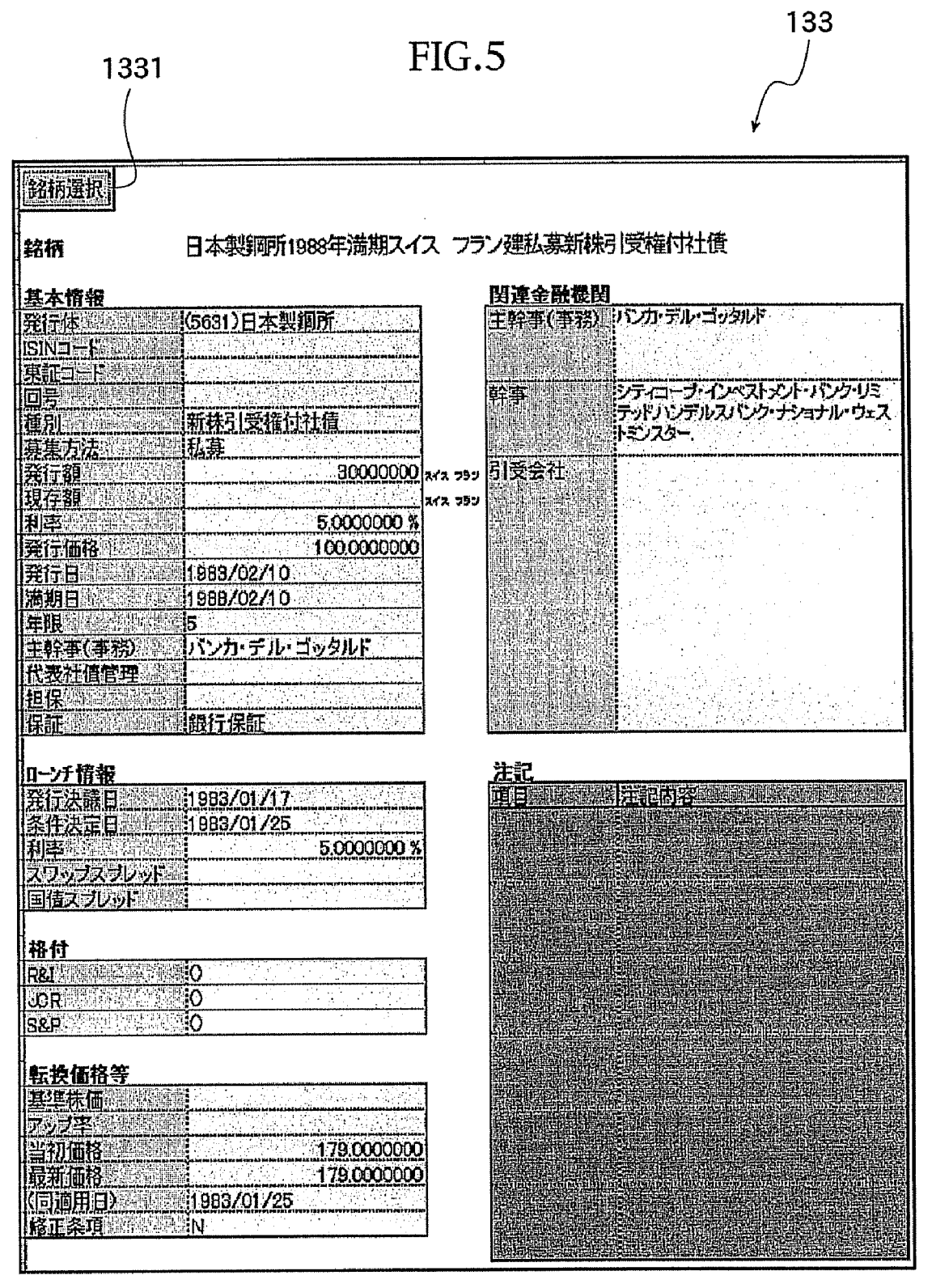

| | |
|---|---|
| 発行体 | (5631)日本製鋼所 |
| ISINコード | |
| 東証コード | |
| 回号 | |
| 種別 | 新株引受権付社債 |
| 募集方法 | 私募 |
| 発行額 | 30000000 スイス フラン |
| 現存額 | スイス フラン |
| 利率 | 5.0000000 % |
| 発行価格 | 100.0000000 |
| 発行日 | 1983/02/10 |
| 満期日 | 1988/02/10 |
| 年限 | 5 |
| 主幹事(事務) | バンカ・デル・ゴッタルド |
| 代表社債管理 | |
| 担保 | |
| 保証 | 銀行保証 |

関連金融機関

| | |
|---|---|
| 主幹事(事務) | バンカ・デル・ゴッタルド |
| 幹事 | シティコープ・インベストメント・バンク・リミテッド・ハンデルスバンク・ナショナル・ウェストミンスター. |
| 引受会社 | |

ローンチ情報

| | |
|---|---|
| 発行決議日 | 1983/01/17 |
| 条件決定日 | 1983/01/25 |
| 利率 | 5.0000000 % |
| スワップスプレッド | |
| 国債スプレッド | |

注記

| 項目 | 注記内容 |
|---|---|

格付

| | |
|---|---|
| R&I | 0 |
| JCR | 0 |
| S&P | 0 |

転換価格等

| | |
|---|---|
| 基準株価 | |
| アップ率 | |
| 当初価格 | 179.0000000 |
| 最新価格 | 179.0000000 |
| (同適用日) | 1983/01/25 |
| 修正条項 | N |

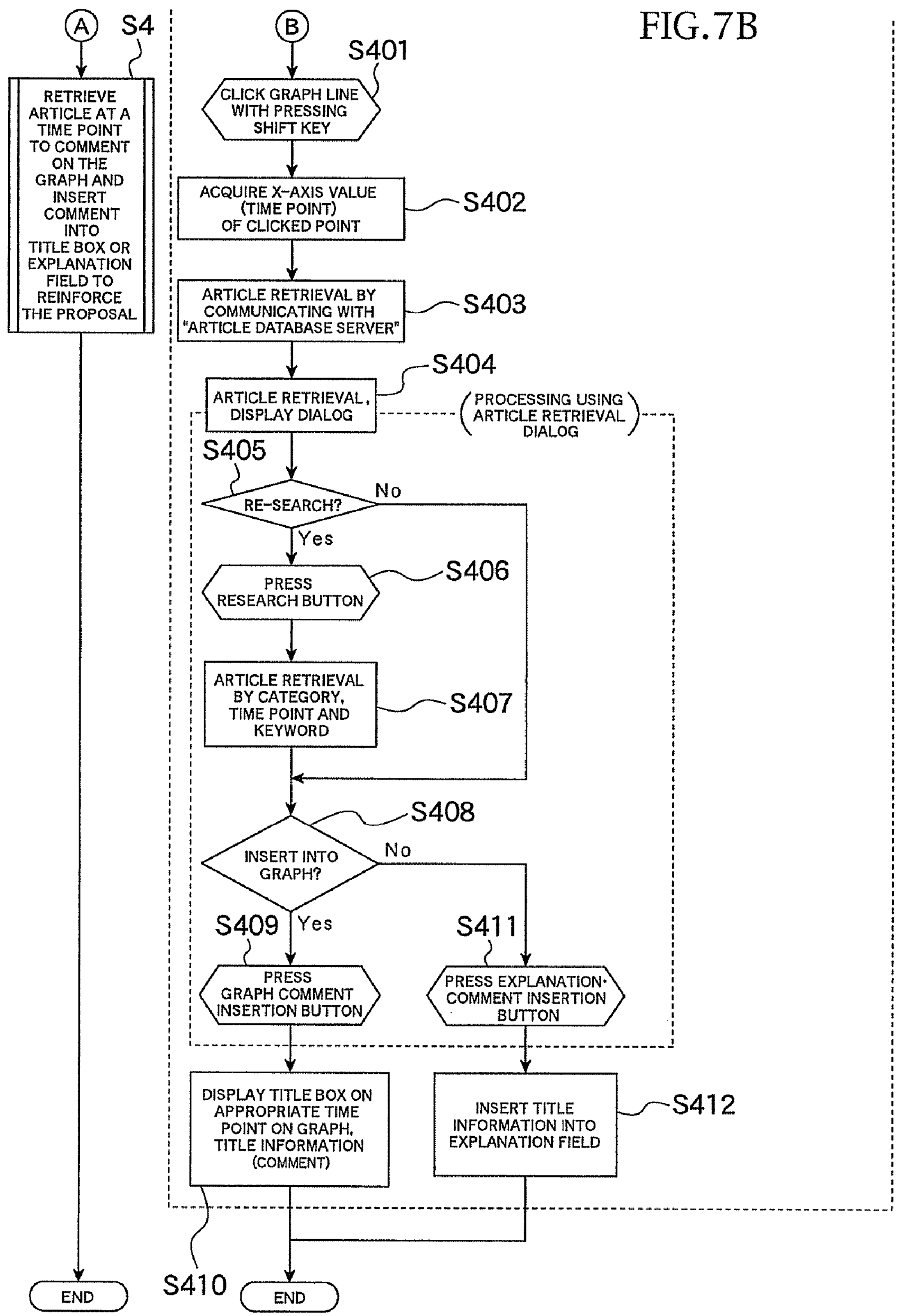
FIG.7B
A
S4
RETRIEVE ARTICLE AT A TIME POINT TO COMMENT ON THE GRAPH AND INSERT COMMENT INTO TITLE BOX OR EXPLANATION FIELD TO REINFORCE THE PROPOSAL
END
B
S401
CLICK GRAPH LINE WITH PRESSING SHIFT KEY
ACQUIRE X-AXIS VALUE (TIME POINT) OF CLICKED POINT
S402
ARTICLE RETRIEVAL BY COMMUNICATING WITH "ARTICLE DATABASE SERVER"
S403
S404
ARTICLE RETRIEVAL, DISPLAY DIALOG
(PROCESSING USING ARTICLE RETRIEVAL DIALOG)
S405
RE-SEARCH?
No
Yes
PRESS RESEARCH BUTTON
S406
ARTICLE RETRIEVAL BY CATEGORY, TIME POINT AND KEYWORD
S407
S408
INSERT INTO GRAPH?
No
S409
Yes
S411
PRESS GRAPH COMMENT INSERTION BUTTON
PRESS EXPLANATION· COMMENT INSERTION BUTTON
DISPLAY TITLE BOX ON APPROPRIATE TIME POINT ON GRAPH, TITLE INFORMATION (COMMENT)
INSERT TITLE INFORMATION INTO EXPLANATION FIELD
S412
S410
END 1B
12
13
11
15
TERMINAL
OPERATION SEC.
DISPLAY SEC.
CONTROL SEC.
I/F SEC.
11
8
2
1ST COMM. SERVER
3
ARTICLE DATABASE SERVER
2ND COMM. SERVER
4A
STORAGE SEC.
421
42
FILE FOR MODEL FORM PAGE
41
5
ECONOMY STATISTIC DATABASE SERVER
12
TERMINAL
I/F SEC.
CONTROL SEC.
I/F SEC.
MATERIAL CREATION SEC.
CORE・ADD-IN SEC.
PROCESSING SEC.
ACQUIRING SEC.
CORPORATE DATABASE SERVER
1n
TERMINAL
44a
43
451
45
452
44b
7

MATERIAL CREATION SUPPORT DEVICE, MATERIAL CREATION SUPPORT SYSTEM, AND PROGRAM

CROSS REFERENCE TO RELATED APPLICATIONS

This application claims the benefit under 35 U.S.C. Section 371, of PCT International Application Number PCT/JP2005/021773, filed Nov. 28, 2005 and Japanese Application No. 2005-223439, filed Aug. 1, 2005 in Japan, the contents of which are incorporated herein by reference.

FIELD OF THE INVENTION

The present invention relates to a material creation supporting technology for creating various written materials.

BACKGROUND OF THE INVENTION

In a promotional sales activity etc. by sales person, many presentation materials are usually used. In particular, in securities or finance businesses, proposed goods materials or proposed goods promotional materials (hereinafter simply referred to as "proposed goods materials") briefly outlining the proposed goods (hereinafter simply referred to as "proposed goods") such as bonds and stocks etc. that the salesperson wants to sell to his/her clients, are often used. Also the background materials containing information to encourage the client's motivation to purchase the proposed goods (hereinafter simply referred to as "background materials") are often prepared as presentation materials and presented to the clients when providing advice on the asset management and product sales of bonds, stocks and investment trust fund etc. These background materials are often formed with a group of numerical values mainly representing the basic situations of economic environment (for example, past social events or economic trend etc.). In order to visually describe the change in such numeric values, graphs are usually used. Therefore, material creation support systems including graphs etc. have been known (for example, refer to Patent Document 1) Patent Document 1: Japanese Patent publication H8-180037 A.

DISCLOSURE OF THE PRESENT INVENTION

Problems to be Solved in the Present Invention

However, in the material creation support system in the patent document 1, creation of a graph from numerical values can be facilitated but characters or symbols etc. other than the graphs can not be inserted. Usually, graphs showing economic or interest-rate trend are displayed as line or bar graphs with the time series on one axis and economic indices on the other axis. However, ordinary people who are not familiar with the economy or interest rate can hardly understand the meaning of the change in the slope of the line graph or length of the bar graph. Therefore, in the above mentioned presentation materials, it is necessary to make people understand the meaning of the slope or the length by inserting the letters or symbols to support the variations of the slope or length. Fluctuation in the economy and interest rate is mainly reflected by the economic and social facts so that a lot of time and labor is required to find the fluctuation factors from the huge past social and economic events and to post them on the graphs, being inconvenient for people who engage in creating such materials.

The present invention was made to solve such problems, and the problems to be solved in the present invention is to provide a material creation support device and a material creation support system which can select and insert character information corresponding to the graphs and create presentation materials easily.

Means to Solve the Problems

Such problems can be solved by a first aspect of the present invention in which a material creation support device comprising:

graph creation means for creating a graph with a time information as a parameter on one axis based on a numeric value information comprising a plurality of numeric values and for displaying the graph on a plot area;

time information acquiring means for acquiring the time information at a clicked point in the plot area when the plot area displayed on a display means is clicked by an operation means and the clicking is detected;

character information acquiring means for acquiring, based on the acquired time information, a character information whose one of attribute information matches the time information acquired from a character data storage means in which a plurality of character information to which a predetermined year/month/day information is attached as one of attribute information, are stored; and character information insertion means for inserting the character information acquired from the character data storage means into the plot area or the vicinity of the plot area and for displaying it.

In a second aspect of the present invention, in addition to the first aspect, the character information acquiring means acquires the character information based on another predetermined attribute information in addition to the one of attribute information.

In a third aspect of the present invention, in addition to the second aspect, in which the character information stored on the character data storage means is at least one of analysis information selected from a group consisting of a title information of a past newspaper article, a title information of a past magazine article, economy, business climate and market conditions; the one of attribute information is an issued date, year/month/day information of the newspaper or magazine on which the article appeared; and the predetermined attribute information is at least either one of the category information or the key word information of the newspaper or the magazine article which is a source of the title information.

In a fourth aspect of the present invention, in addition to the first aspect, in which the device further comprises data controlling means for storing a specific numeric value information on a specific storage region by accessing the numeric value data-storage means in which the specific numeric value information is stored and for supplying the stored numeric value information into the graph creation means according to a demand when the graph creation means creates the graph.

In a fifth aspect of the present invention, in addition to the first aspect, the device further comprises material creation means for creating a material containing the graph created by the graph creation means as content information.

A sixth aspect of the present invention is a material creation support system comprising:

a material creation support device according to any one of the first to fifth aspects which is capable of communicating data under a network environment;

character data storage means for storing a plurality of character information to which a predetermined year/month/day information is attached as one of attribute information, and for supplying the character information to the material creation support device; and economic statistics data storage means for storing numeric value information of a past economic or business trend and for supplying the numeric value information to the material creation support device.

A seventh aspect of the present invention is a program for making a computer operate as the material creation support device according to the first aspect mentioned above.

Effects of the Present Invention

According to the first aspect of the present invention, in the graph created by the graph creation means, character information having a semantic content relating to the content of the graph is acquired from the data storage means, based on the time information which is a parameter on one axis of the graph clicked. Therefore, character information etc. corresponding to the content of the graph can be acquired based on the time information of the clicked graph. In addition, character information acquiring means can acquire character information whose attribute information matches the attribute information of the acquired time information of the graph from the character information to which year/month/day information is added as the attribute information. Therefore, character information at a specific time point can be acquired so that character information suitable for a graph that sharply varies with time can be easily acquired. Further, the character information acquired from the storage means is inserted into the plot area or the vicinity of the plot area and displayed. Therefore, input of the acquired character information can be easily conducted. Accordingly, selection and input of the character information can be carried out easily and the presentation materials can be easily created.

According to the second aspect of the present invention, the character information acquiring means acquires character information having a predetermined attribute information. Therefore, acquiring condition of the character information can be setup precisely and desired character information can be acquired more easily.

According to the third aspect of the present invention, the character information stored on the character data storage means is at least one of analysis information selected from a group consisting of a title information of a past newspaper article, a title information of a past magazine article, economy, business climate and market conditions;
the one of attribute information is an issued date, year/month/day information of the newspaper or magazine on which the article appeared; and
the predetermined attribute information is at least either one of category information or the key word information of the newspaper or the magazine article which is a source of the title information. Therefore, character information can be formed based on the past news information. And in a graph which is highly dependent on the past facts, character information which matches the needs of the operator can be formed.

According to the fourth aspect of the present invention, frequently-used numerical information is previously acquired from the economic statistics data storage means and stored on a predetermined storage region. Accordingly, the stored numerical information can be supplied to the graph creation means according to the demands of the graph creation means. Therefore, the number of access to the economic statistics data storage means can be reduced so that the network load can be reduced, being able to speed up the graph creation processing.

According to the fifth aspect of the present invention, the material creation means creates a material containing the graph created by the graph creation means as content information. Therefore, insertion of a graph into the material can be performed mechanically by the material creation means, not manually. The creation of a material with the graph can be carried out easily.

According the sixth aspect of the present invention, the material creation support device described by any one of the first to seven aspects can communicate data under the network environment, and character information from the character data storage means and numerical value information from the economic statistic data storage means are supplied to the material creation support device. Therefore, the operation of the material creation support device according to any one of the first to fifth aspects can be conducted at the client side server system so that unspecified majority can utilize this device under the network environment.

According to the seventh aspect of the present invention, the present invention can be made programmed and downsized, being able to realize the present invention using various computer hardwares.

BRIEF DESCRIPTION OF THE DRAWINGS

FIG. 1 is a system and block diagram of a first embodiment of a material creation support system of the present invention.

FIG. 2 is a pattern diagram of article information stored on an article database server of the material creation support system.

FIG. 3 is a pattern diagram of a background material creation sheet displayed on a display section of the material creation support device of the material creation support system.

FIG. 5 is a pattern diagram of a proposed goods material display sheet displayed on the display section of material creation support device of the material creation support system.

FIG. 7B is a flowchart showing a content creation procedure for a background material in the material creation support system.

PREFERRED EMBODIMENTS OF THE PRESENT INVENTION

Figure 4:
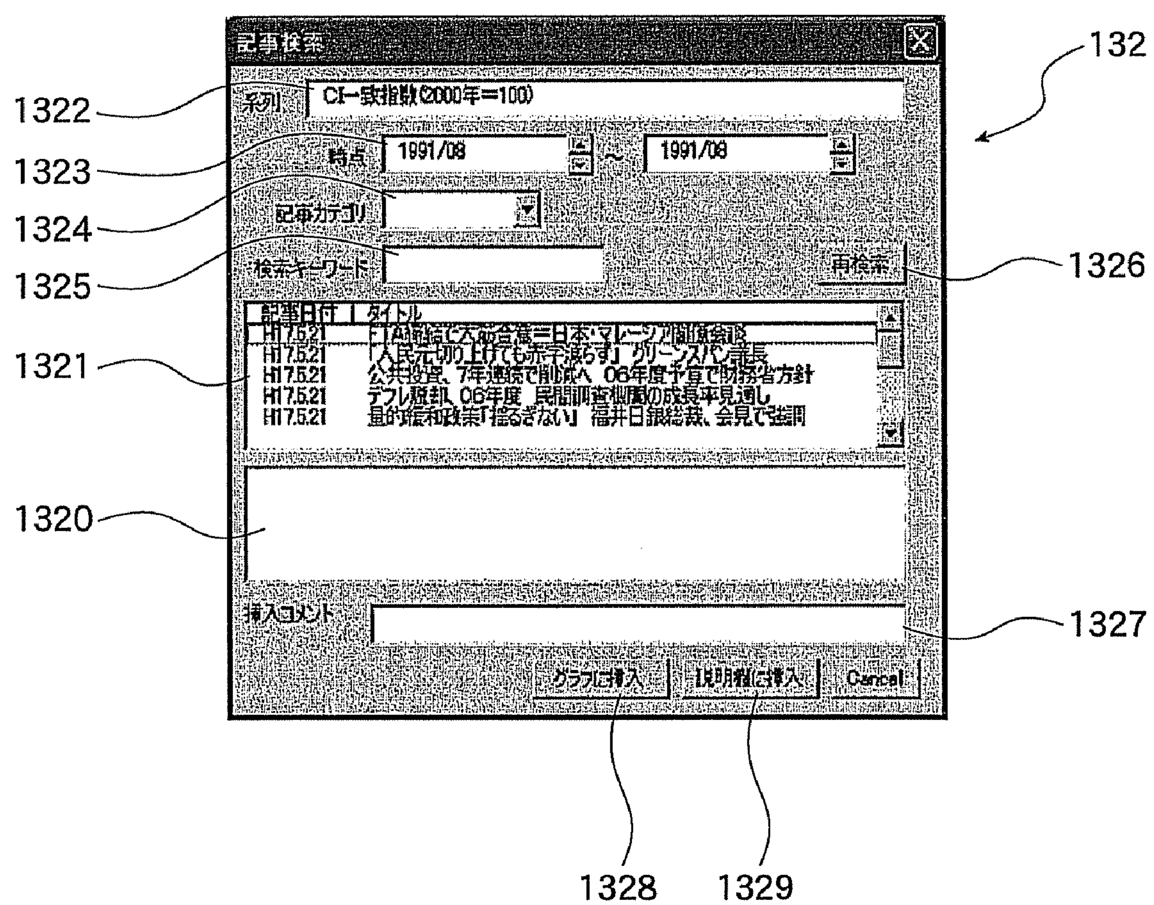
FIG. 4 is a pattern diagram of an article retrieval dialogue displayed on the display section of the material creation support device of the material creation support system.

Preferred embodiments of the present invention will be described hereunder.

FIG. 1 represents a system diagram and a block diagram of a first embodiment of the present material creation support system.

In FIG. 1, the material creation support system 1A comprises a material creation support device (or unit) 1, a first communication server 2, an article database server (character data storage means) 3, a second communication server 4, an economic statistics database server (economic statistics data storage means) 5, a third communication server 6, a corporation database server 7 and the internet 8.

The material creation support unit 1 is a computer terminal such as a personal computer, a mobile computer, a PDA (Personal Digital Assistance), a wireless communication terminal equipment, which have a communication function and can be used under the network environment. As shown in FIG. 1, the unit 1 comprises a control section 11, an operation section 12, a display section 13, a storage section 14, interface sections (I/F) 15*a*, 15*b*, 15*c*, a material creation section (material creation means) 16, a core add-in section (graph creation means) 17 and an economic statistics data control section (data control means) 18.

The control section 11 has a CPU (Central Processing Unit) and arithmetically processes an OS (Operating System) program and various application programs stored on the storage section 14 and controls all of the material creation procedures in collaboration with the results of such processing of the OS. In addition, in the first embodiment, function and control in the material creation section 16, the core add-in section 17 and the economic statistics data-control section 18 can be performed by making the CPU of the control section 11 compute the OS and/or application programs stored on the storage section 14.

The operation section 12 is a mouse or keyboard etc. and is used to input various instructions to the material creation support unit 1 and the first to third communication servers 2, 4 and 6.

The display section 13 has a LCD etc. and displays various instructions and/or picture image that are input from the operation section 12.

The interface sections 15*a*, 15*b*, 15*c* are a UTP cable port, a light cable port and various device drivers and are used to connect with a LAN cable such as 10BASE-T cable, 100BASE-TX cable etc. or a light cable and perform necessary processing to carry out data communications within the first to third communication servers 2, 4 and 6 through the internet 8.

The material creation section 16 communicates with the first communication server 2 through the interface section 15*a*, controls the model form page that is used in creating background materials or the proposed goods materials and performs various processing to create the background material or the proposed goods material based on such model form page. In the background materials or the proposed goods materials created at the material creating section 16, various contents are contained. Here, the content is a graph or table etc. representing the indicated information that gives or adds value to the materials such as the background materials or the proposed goods materials (the content has the same meaning throughout the specification).

The core add-in section 17 has a communication function to communicate with the economic statistics data-control section 18 and the third communication server 6 and a content creation function to create a content contained in the background material or the proposed goods material which is created at the material creation section 16. The core add-in section also executes various processing to realize such functions.

The core add-in section 17 and the third communication server 6 communicate with each other using SOAP (Simple Object Access protocol) message based on the HTTP protocol. And the core add-in section 17 is linked and connected to the content contained in the background material or the proposed goods material created at the material creation section 16. In addition, the core add-in section 17 comprises a graph information processing section (time information acquiring means) 171 for acquiring time information as a parameter of the content and a category information of the graph, and a character information acquiring section (character information acquiring means) 172 for acquiring a character information (described later) having one of attribute information or a predetermined attribute information (described later) and for performing a necessary processing.

The core add-in section 17 functions as a character information insertion means of the present invention (precisely described later).

The economic statistics data control section communicates with the second communication server 4 through the interface section 15*b* and controls the economic statistics data stored on a storage database (a predetermined storage region, described later) in the storage section 14. The communication between the economic statistics data control section 18 and the second communication server 4 is carried out using HTTP protocol.

The storage section 14 comprises a ROM on which programs and data used at the time the control section 11 performs various processing are previously stored, a RAM on which such programs and data etc. are temporarily stored, a EEPROM on which data necessary to be rewritten is stored and a hard disk on which various file data are stored, etc. On the ROM, application programs to function and control the material creation section 16, the core add-in section 17, the economic statistics data control section 18 as well as the OS program are stored. The RAM forms a cache memory etc. Frequently used programs or files are temporally stored on the cache memory to secure an area for the storage database (storage DB) 142. On the hard disk, a model form file 141 to be used at the material creation section 16 is stored.

The model form file 141 is a file group that can be processed and modified for creating content at the core add-in section 17. More precisely, the model form file 141 is formed with a file group in which each background material and proposed good material are formatted by genre sorted in descending order of use frequency respectively and then each format is interrelated, by link connection, with the content to be utilized.

The storage database 142 is a temporarily storing area of the statistics control data controlled by the economic statistics data control section 18, and the economic statistics data acquired from the economic information database server 5 by the economic statistics data control section 18 is stored.

The first communication server 2, second communication server 4 and third communication server 6 are Web servers and each performs a data communication function through the internet 8.

The article database server 3, economic statistics database server 5, corporation database server 7 each has a large volume of data storage area such as hard disk etc. and stores a large volume of data tables as a file data.

On the economic database server 5, predetermined numerical information is stored. Here, the predetermined numerical value information of this embodiment is numerical data of the past 20 to 30 years of past economic or business trends such as economic trend information, interest rate trend information and real estate industry trend information etc. More precisely, numerical values indicating various economic trend as economic trend information (for example, CI (Diffusion Index) leading index, CI coincidence index, consumer durable goods shipment index etc.), numerical values of various interest rate as interest-rate trend information (such as official money rate, half year TIBOR, 5-year swap rate, 10-year interest rate of government bond etc.) and numerical values indicating various trend of real estate industry of the past 20 to 30 years (for example trend indices such as the number of land acquisition or the number of request of disposal of real estate, and numerical value of trend indices such as the number of contract etc.) as real estate industry trend information are stored on a monthly or daily base.

On the corporate database server 7, the proposed goods and proposed goods-related information are stored. In particular, detailed information on the proposed goods such as bonds and stocks (brand, basic information, launch information, ranking information and conversion price information etc. of a bonds or stocks (described later)), issuer (corporate name), type of business of issuer etc., brand of each proposed goods etc. are stored in the form of dozens of file data.

FIG. 2 is a schematic diagram of an article information stored on an article database server 3 of the material creation support system 1A of the first embodiment. As shown in FIG. 2, the article information 31 comprises title information (character information) 32, year/month/day information 33, category information 34, key word information 35, and article body information 37. Each line of the article information 31 forms one data unit 36*a*, 36*b*, 36*c* . . . . In each data unit 36*a*, 36*b*, 36*c* . . . , year/month/day information 33 forms one attribute information in the first embodiment, and the category information 34, key word information 35, the article body information 37 forms a predetermined attribute information in the first embodiment. The title information 32 is an information, in the form of text, of titles of a past newspaper or magazine article, the article body information 17 is an information of the article body in the form of text, year/month/day information 33 is an information of published date, year/month/day of a newspaper or magazine in which the news or magazine article is placed, the category information 34 is a category of an article (for example politics, economics, social issues etc.) of the title information 32, and the keyword information 35 is a group of main words that characterizes the content of the article in the title information 32.

FIG. 3 is a schematic diagram of the background material creation sheet 131 displayed on the display section 13 of the material creation support unit 1 in the material creation support system 1A of the first embodiment. The background material creation sheet 131 is comprised of;

a graph display section 1310 on which procedures of graph processing in the core add-in section 17 (FIG. 1) is displayed;

a plot area 1310*a* that displays a graph;

a subject field 1311 for selecting a subject (hereinafter referred to only as "subject") as a genre (for example, "economic trends" in FIG. 3, "interest rate trends", "real estate trends" etc.) of graph displayed on the graph display section 1310;

a left axis field 1312 for selecting a parameter on a left side longitudinal axis of a graph displayed on the plot area 1310*a;* a right axis field 1313 for selecting a parameter on a right side longitudinal axis;

a check box 1314 for making the plot area 1310*a* display character information indicating a recession period;

a report creation button 1315 for instructing the core add-in section 17 (FIG. 1) to create a report with a graph displayed on the plot area 1310*a;*

Y axis scale adjusting spin buttons 1316*a*, 1316*b*, 1316*c*, 1316*d* for changing and adjusting the maximum value, minimum value, scale length etc. of the Y axis (the left side longitudinal axis of the plot area 1310*a*);

second Y axis scale adjusting spin buttons 1316*e*, 1316*f*, 1316*g*, 1316*h* for changing and adjusting the maximum value, the minimum value, scale length etc. of the second Y-axis (right side longitudinal axis in the graph displayed on the graph display unit 1310)

X-axis scale spin buttons 1316*i*, 1316*j*, 1316*k*, 1316*l* for changing and adjusting the maximum value, the minimum value, scale length etc. of the X-axis (horizontal axis of a graph as "one of axis" displayed on the plot area 1310*a*, time information such as year/month/day etc. is used as a parameter);

a Y-axis setup check box 1316*n* for automatically setting up the maximum value, the minimum value, scale length etc. of the Y-axis;

a second Y-axis setup check box 1316*o* for automatically setting up the maximum value, the minimum value, scale length etc. of the second Y-axis;

an article time period button 1316*m* for automatically setting up the entire time period of X-axis as a period to be checked; and an X-axis scale scroll bar 1317 for shifting parallel the maximum and minimum value of X-axis. In the plot area 1310*a*, a cyclical recession period display boxes 1314*a*, 1314*b*, . . . for displaying the "cyclical recession period" using characters and a graph comments box 1318 which is a character information corresponding to a change of the graph are displayed. In the lower side of the margin of the graph display field 1310, an explanation field 1319 for displaying the character information corresponding to the graph is provided. The plot area 1310*a* has an interface function and detects a click and a drug operations by the operation section 12.

FIG. 4 is a schematic diagram showing the article retrieving dialogue 132 displayed on the display section 13 of the material creation support unit 1 of the material creation support system 1A of the first embodiment. The article retrieving dialogue 132 has a retrieved result display and selection field 1321 on which the title information etc. (as shown in FIG. 2) as a retrieval result is displayed and desired information on the displayed title information etc. can be selected by the operation of the operation section 12 (FIG. 1); a series name display field 1322 for displaying a series name of the subject to be retrieved (or of a graph displayed on the plot area 1310*a* (FIG. 3) a time point selection field 1323 for selecting in chronological order the starting and ending time point of the article retrieval; an article category selection field 1324 for selecting the article category; a retrieval keyword input field 1325 for inputting the retrieval keyword; a further retrieval instruction button 1326 for instructing to perform retrieval again; an article body display field 1320 for displaying an article body information 37 (FIG. 2) which are associated with the selected title information among the title information displayed on the retrieved result display and selection field 1321; a comment insertion field 1327 for displaying a desired character information on the article information plot area 1310*a* (FIG. 3); an "insertion into graph" button 1328 for instructing to conduct an insertion of the title information displayed on the retrieved result display and selection field 1321 and an article body information displayed on the article body display field 1320 into a graph comment box 1318 (FIG. 3); and an "insertion into explanation field" button 1329 for instructing to conduct an insertion of the character information input into the comment insertion field 1327 into a explanation field 1319 (FIG. 3). In addition, each article category and retrieval keyword are made associated with each other and registered on the series name displayed on the series name display field 1322. And the registered information is stored as a table (not shown) on the storage means 14 (FIG. 1).

FIG. 5 is a schematic diagram of a proposed goods material-display sheet 133 displayed on the display section 13 of the material creation support unit 1 of the material creation support system 1A of the first embodiment. On the proposed goods material display sheet 133, a brand of proposed goods as recommended goods (hereinafter referred to as "proposed goods"), basic information such as issuer and category of a bond etc. as the proposed goods, launch information such as an issue date and interest rate etc., information on the proposed goods such as bond rating, conversion price, related financial organization, explanatory note etc. are displayed on almost all area of a screen. And a brand selection button 1331 which can be clicked with the operation section 12 (FIG. 1) is provided on the left upper side of the screen. In addition, the proposed goods information displayed on the proposed goods material display sheet 133 are all extracted from a corporate database server 7 (FIG. 1). Each item of the proposed goods information is embedded into a cell of the table as a function, and the alignment of the items can be freely moved and compiled. The alignment is maintained regardless of the change in the proposed goods.

Figure 6A:
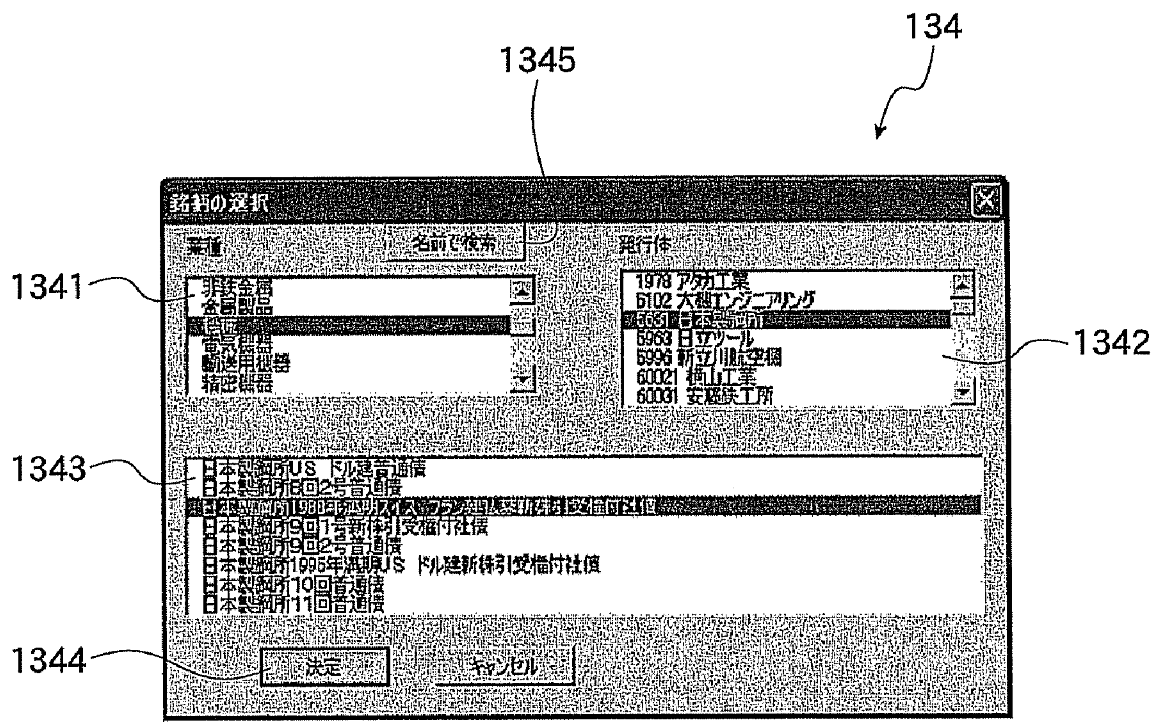
FIG. 6A is a pattern diagram of a first brand selection dialogue 134 and FIG. 6B is a second brand selection dialogue 135 of the material creation support system.
Figure 6B:
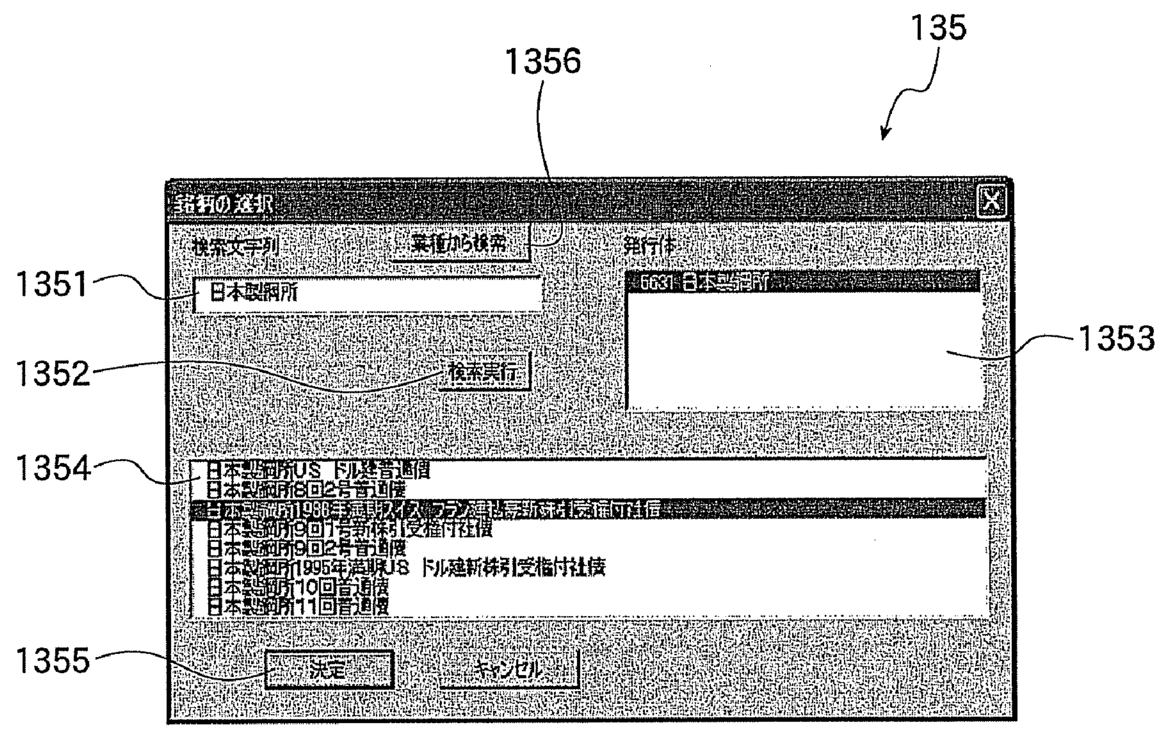

FIGS. 6A and 6B are schematic diagrams of the brand selection window displayed on the display section 13 of the material creation support unit 1 of the material creation support system 1A of the first embodiment. FIG. 6A is a schematic diagram of a first brand selection dialogue 134 for selecting the brand of the proposed goods from the type of business. FIG. 6B is a schematic diagram of a second brand selection dialogue 135 for selecting the brand of the proposed goods from the name (name of corporation). When the brand selection button 1331 (FIG. 5) of the proposed goods material creation sheet 133 is clicked, either one of display window 134 or 135 is displayed. The first brand selection dialogue 134 is composed of a business type display selection field 1341, the issuer display selection field 1342, a goods brand display selection field 1343, and a decision button 1344 for indicating the decision of the goods selected at the goods brand display selection field 1343. The second brand selection dialogue 135 is composed of a search string input field 1351 to which goods brand to be retrieved is entered in the textual form, a retrieval execution button 1352 for indicating the start of the retrieval by the character string input into the search string input field 1351, the issuer display selection field 1353, the goods brand display selection field 1354 and a decision button 1355 for indicating the decision of the goods selected at the goods brand display selection field 1354. In addition, the first brand selection dialogue 134 is composed of a first dialogue change button 1345 for changing the display dialogue to the second brand selection dialogue 135, and the second brand selection dialogue 135 is composed of a second dialogue change button 1356 for changing the display dialogue to the first brand selection dialogue 134, so that the first brand selection dialogue 134 can be changed to the second brand selection dialogue 135 and vice versa. Here, the brand displayed on the goods brand display selection field 1343 is extracted from the corporate database server 7 (FIG. 1).

Next, the operation of the first embodiment will be explained.

Figure 7A:
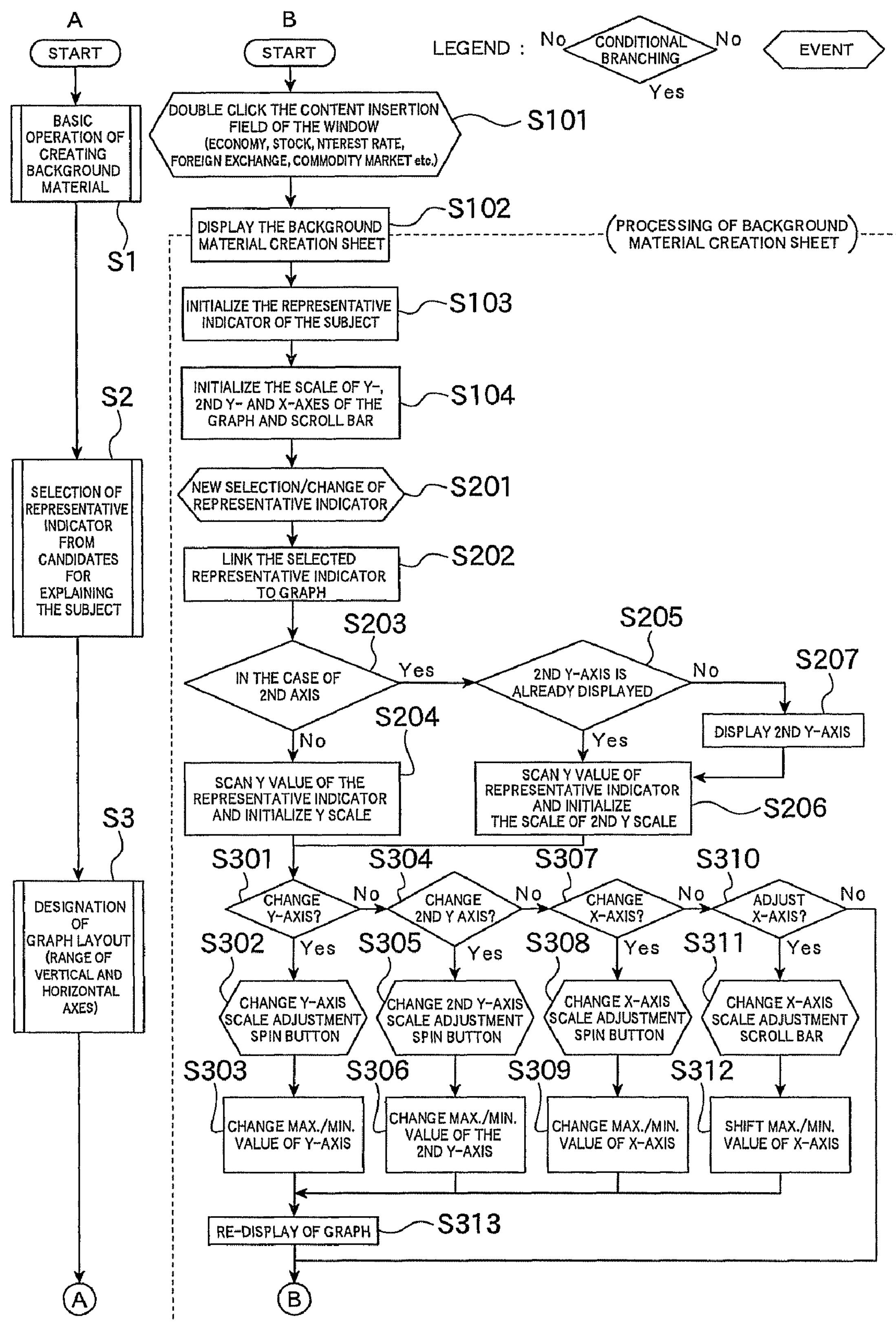
FIG. 7A is a flowchart showing a content creation procedure for a background material in the material creation support system.

FIGS. 7A and 7B are flow charts showing procedures of creating content for background material of the material creation support system 1A of the first embodiment. In these Figures, the flow A shows an outline of the content creation procedures in the material creation support system 1A and the flow B shows precise procedures of the content creation shown in the flow A. More precisely, for example, the step S1 in the flow A corresponds to the steps S101 to S104 in the flow B, value of the hundreds place of the number of steps in the flow B corresponds to the number of steps in the corresponding flow A. Process procedures will be explained below with reference to the flow chart.

At first, an operator of the material creation support system 1A performs a basic operation for creating background material (step S1 in flow A).

More precisely, the operator enters an indication to display a model form on the display section 13 by operating the operation section 12 of the material creation support unit 1. When there is such indication, the material creation section 16 reads out a file for a model form page of the background material from the storage section 14 and displays the model form page of the background material on the display section 13. In the model form page of the background material, an insertion field of the content (mainly graph) is contained. When the insertion field of the content displayed on the display section 13 is double clicked by the operation of the operation section 12 (mouse), the core add-in section 17 receives such indication and displays the background material creation sheet 131 linked to the clicked background material on the display section 13 (step S102 of the flow A). The core add-in section 17 initializes a representative index of the selected subject (step S103 of the flow A), and also initializes scale values of Y-axis, a second Y-axis, X-axis of the graph and a scroll bar 1317 displayed on the plot area 1310*a* (step S104). In the subject field 1311 displayed, by the operation section 12, on the background material creation sheet 131, the core add-in section 17 displays a background material creation sheet of a different subject when a subject other than the current subject ("economic trend" in FIG. 3) is selected.

Next, a representative index of economic statistics is selected from the candidate indices in order to explain the subject of the background material creation sheet 131 (step S2 in flow A).

More precisely, with the operation of the operation section 12 by the operator, the representative index is newly selected or changed in the left axis field 1312 and the right axis field 1313 (step S201 in flow B). The core add-in section 17 instructs the economic statistics data-control section 18 to send the representative index. The economic statistics data control section 18 acquires an appropriate economic statistics information corresponding to the representative index from the stored database 142 or the economic statistics database server 5 (by way of the second communication server 4) and sends the information to the core add-in section 17. The core add-in section 17 links the received information to a graph and displays the received information on the plot area 1310*a* (step S202). When the information received from the economic statistics data control section 18 is a parameter indicated on Y-axis (or a parameter indicated on the left axis field 1312) ("No" at step S203), the core add-in section 17 initializes the scale of Y-axis by scanning the size of the value of the information (step S204). When the information received is a parameter displayed on the second Y-axis (or a parameter displayed on the right axis field 1313) ("Yes" at step S203) and the second Y-axis is already displayed ("Yes" at step S205), the core add-in section 17 scans the size of the value of the information and initializes the scale of the second Y-axis (step S26). When the second Y-axis is not yet displayed ("NO" at step S205), the core add-in section 17 scans the size of the value of the information after the second Y-axis is displayed (step S207) and initializes the scale of the second Y-axis (step S206).

And when there is no need to change the representative index displayed at step S103 or the initial setting set at step S104, steps S201 to S206 described above can be omitted.

Next, a graph layout (dimension of longitudinal axis and horizontal axis) displayed on the plot area 1310*a* is specified (step S3 in flow A).

More precisely, in the case where Y-axis is changed ("Yes" at step S301), when the Y-axis scale spin buttons 1316*a*, 1316*b*, 1316*c* and 1316*d* are operated by the operation section 12 (step S302 in flow B), the core add-in section 17 changes, according to the operation, the maximum and/or minimum value of Y-axis displayed on the plot area 1310*a* (step S303). In the case of the change in the second Y-axis ("Yes" at step S304), not in Y-axis ("No" at step S301), when the second Y-axis spin buttons 1316*e*, 1316*f*, 1316*g* and 1316*h* are operated (step S305), the core add-in section 17 changes the maximum and/or minimum value displayed on the second Y-axis (step S306). In the case of the change in X-axis ("Yes" at step S307), not in the second Y-axis ("No" at step S304), when X-axis spin buttons 1316*i*, 1316*j*, 1316*k* and 13161 are operated (step S308), the core add-in section changes the maximum and/or minimum value displayed on X-axis (step S309). In the case of an adjustment in the X-axis ("Yes" at S310), not in the case of the change in X-axis ("No" at step S307), when the X-axis scale scroll bar 1317 is operated (step S311), the maximum and/or minimum value displayed on X-axis is shifted (step S312). In the case of no change in X-axis, ("No" at step S310), no event occurs. In addition, in the case where the Y-axis setup-check box 1316*n*, the second Y-axis setup-check box 1316*o* and an entire time period button 1316*m* are checked, the core add-in section 17 performs the same operation as in the steps S301 to S312 mentioned above. After the steps S301 to S312 mentioned above, the core add-in section 17 re-displays the graph on the plot area 1310*a* based on the processing of such steps (step S313)

Next, setup processing to retrieve articles at the time point the operator wants to comment on the graph and to display the comment to reinforce a proposal of the proposed goods on a graph comment box 1318 and an explanation field 1319 in the graph are performed (step S4 in flow A).

More precisely, when any arbitrary position in a graph displayed on the plot area 1310*a* is clicked (clicking with pushing a shift key on a keyboard) of the operation section 12 (keyboard or mouse) (step S401 in flow B), the graph information processing section 171 of the core add-in section 17 acquires the year/month/day information based on the X-coordinate (or time information at the clicked position) of the clicked position and also acquires the category and keyword information from the table (not shown) of the storage means 14 (step S402). The character information acquiring section 172 receives the year/month/day information, the category information and the keyword information acquired by the graph information processing section 171 and then acquires data unit 36*a*, 36*b*, 36*c* . . . which correspond to the year/month/day information and the category information and the keyword information from among the article information 31 stored on the article database server by communicating with the first communication server 2 (step S403). For example, when the acquired year/month/day information is "May 21, 2005", the category information which corresponds to the clicked graph is "economy", and the keyword information is a plurality of economic related keyword (for example, "FTA" "Chinese yuan" "budget" etc.), the core add-in section 17 acquires, from the article information 31 in FIG. 2, the year/month/day information 33 that is "2005/05/21", the category information 34 containing "economy" and the keyword information 35 containing the data unit 36*a*, 36*b*, 36*c* . . . which contain economic related keywords.

The core add-in section 17 displays the article retrieval dialogue 132 on the display section 13 and displays on a retrieval result display-and-selection field 1321 each title information 32 of the data unit 36*a*, 36*b*, 36*c* . . . acquired from the article database server 3 (step S404). At this time, the core add-in section 17 displays a series of clicked graphs on a series name display field 1322, displays a start and end time point of an article search (or year/month/day information 33 of the data unit 36*a* which is a subject to be retrieved) on a time point selection field 1323 and displays, on the article category selection field 1324, the category information (or a category information of the data unit 36*a* which is a subject to be acquired) corresponding to the series displayed on the series display field.

When further retrieval is performed under a condition other than that of the acquired title information 32 ("Yes" at step S405), input into a time point selection field 1323 of the article retrieval dialogue 132, selection at the article category selection field 1324 or input into the retrieval keyword-input field 1325 are performed, and clicking of a further retrieval instruction button 1326 (step S406) are performed, with operations of the operation section 12. The character information acquiring section 172 acquires again the data unit 36*a*, 36*b*, 36*c* . . . which correspond to the year/month/day information, category information and keyword information from among the article information 31 stored on the article database server 3 based on the information of the start and end time point of the retrieval displayed on the time point selection field 1323, a category selected at the article category selection field 1324, and a keyword input into the retrieval keyword input field 1325. And then the character information acquiring section displays each acquired title information 32 and the year/month/day information 33 on the retrieval result display selection field 1321 (step S407). When there is no need to perform further retrieval ("No" at step S405), the step S406 and S407 are not performed.

After the title information 32 and year/month/day information 33 are displayed on the retrieval result display-and-selection field 1321, any arbitrary line in the retrieval result display-and-selection field 1321 is clicked with the operation section 12 (mouse), the core add-in section 17 makes the article body display field 1320 display the article body information 37 contained in the data unit 36*a* of the clicked line. Under this state, the operator inputs into an insertion comment field 1327, by copy and past etc. with operation of the operation section 12, a desired information in the title information (title information 32) displayed on the retrieval result display-and-selection field 1321 and article body (article body information 37) displayed on the article body display field 1320.

When an information input into the insertion comment field 1327 is displayed on the plot area 1310*a* ("Yes" at step S408), when a "graph insertion" button 1328 is clicked by the operation section 12 (step S409), a graph comments box 1318 into which an information is input as a comment into the insertion comment field 1327 is inserted into and displayed at a position corresponding to the clicked position in the plot area 1310*a* at step S41, and then the setup processing is completed (step S410). On the other hand, when an information input into the insertion comment field 1327 is displayed on an explanation field 1319 ("No" at step S408), when an "insertion of explanation field" button 1329 is clicked by the operation section 12 (step S411), information input into the insertion comment field 1327 is displayed as a comment on an explanation field 1319 and then the setup processing is completed (step S412).

The material creation section 16 reflects, by link connection, the content created above, on the content insertion field of the model form page of the background material, and incorporates the content into the background material.

Figure 8:
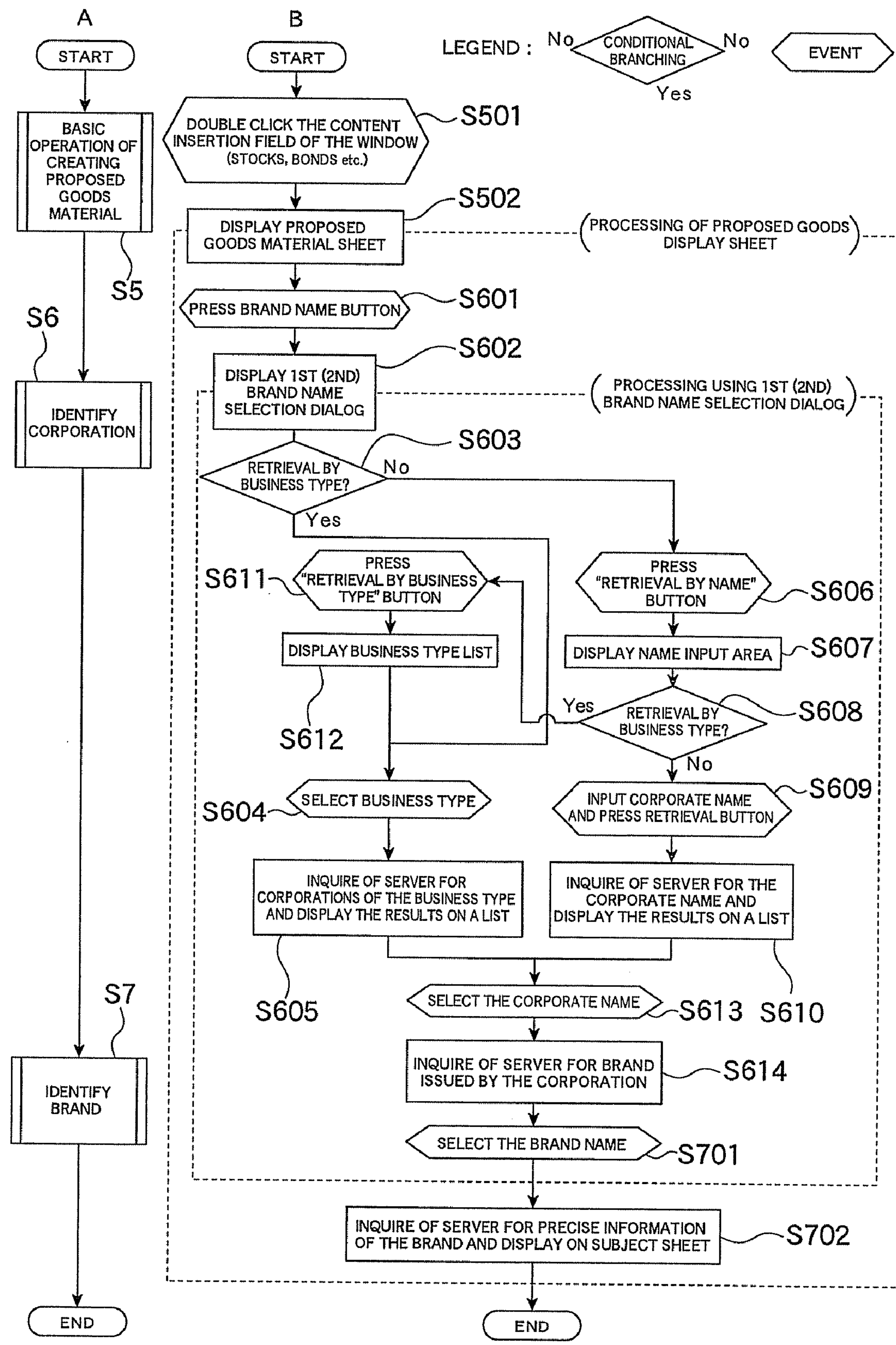
FIG. 8 is a flowchart showing a content creation procedure of the proposed goods material in the material creation support system.

FIG. 8 is a flow chart showing procedures of creating content for proposed goods material in the material creation support system 1A of the first embodiment. Like FIGS. 7A and 7B, flow A corresponds to flow B. Hereunder, processing procedures will be explained with reference to the flow chart.

At first, an operator of the material creation support system 1A performs a basic operation for creating the proposed goods material (step S5 in flow A).

More precisely, the operator operates the operation section 12 of the material creation support unit 1 to give instructions for displaying a model form on the display section 13. When the material creation section 16 receives such instruction, the material creation section 16 reads out a model form page file of the proposed goods material from the storage section 14 and displays the model form page (including an insertion field of the content (mainly table) linked with the proposed goods material display sheet 133) of the proposed goods material on the display section 13. When a portion of the insertion field of the content displayed on the display section 13 is double-clicked by the operation section 12 (mouse), the core add-in section 17 displays the proposed goods material-display sheet 133 on the display section 13 (step S502).

Next, the operator of the material creation support system 1A identifies a corporation, the issuer of the proposed goods (step S6 in flow A).

More precisely, when the brand selection button 1331 is clicked by the operation section 12 after the proposed goods material display sheet 133 is displayed (step S601 in flow B), a first brand selection dialogue 134 is displayed on the display section 13 and the business type list is displayed on a business type display-and-selection field 1341 by the core add-in section 17 (step S602).

In a case where the operator wants to select an issuer by business type ("Yes" at step S603*a*), when a specific line in the business type list displayed on the business type display selection field 1341 is selected and clicked by the operation section 12 (step S604), the clicked line is highlighted (see FIG. 6A) and the core add-in section 17 acquires, through the third communication server 6, corporate names of the business type described on the highlighted line from the corporate database server 7 and displays the corporate names on the issuer display-and-selection field 1342 of a first brand selection dialogue 134 (step S605).

In a case where the operator wants to select a corporate name from business organizations ("No" at step S603), when a first dialogue change button 1345 of a first brand selection dialogue 134 is clicked by the operator using the operation section (step S606), the core add-in section 17 changes the display of the first brand selection dialogue 134 to the second brand selection dialogue 135, and a retrieval character string input field 1351 is displayed (step S607). In a case where the operator wants to continue to perform retrieval from corporate name ("No" at step S608), when the operator inputs using textual form into the search string input field 1351 using the operation section 12 and then the retrieval execution button 1352 is clicked (step S609), the core add-in section 17 communicates with the corporate database server 7 through a third communication server 6 and inquires as to whether an issuer having a corporate name containing the character identified in the search string input field 1351 exists or not and displays the appropriate name of an issuer on the issuer display-and-selection field 1353 (step S610).

However, in a case where the operator wants to select an issuer corporation again from the business type after the step S607 ("Yes" at step S608), when a second dialogue change button 1356 of the second brand selection dialogue 135 is clicked by the operation section 12 (step S611), the core add-in section 17 changes the dialogue again to the first brand selection dialogue 134, and re-displays the business type display-and-selection field 1341 (step S612) and executes the procedures of the steps S604 and S605.

After the procedures of the step S605 or S610, when the operator clicks a corporate name of an issuer in the list, whose goods the operator wants to treat as proposed goods, to highlight the displayed line containing the issuer, the core add-in section 17 asks the corporate database server 7 through the third communication server section 6 as to whether the highlighted issuer exists or not, acquires information about the goods brand issued by the issuer, and then displays a list of goods brands on the goods brand display-and-selection field 1343 (1354) (step S614).

Next, the operator of the material creation support system 1A identifies the brand of the proposed goods (step S7 in flow A).

More specifically, at step S614, when the operator clicks the brand, in the brand list, of the proposed goods that the operator wants to propose, the clicked line is highlighted. In this state, the decision button 1344 (1355) is clicked by the operation section 12 (step S701 of flow B), the core add-in section 17 acquires precise information of the highlighted brand of bond or stock and the acquired precise information of the bond or stock is displayed as the proposed goods information on the proposed goods material display sheet 133 (step S702)

The material creation section 16 inserts such created content into the content insertion field of the model form page of the proposed goods by link connection, so that the created content is incorporated into the proposed goods material.

As shown above, in the graph created by the core add-in section 17 of the material creation support system 1A of the first embodiment, the graph display section 1310 acquires, based on the position clicked by the operation section 12, an article information 31 from the article database server section 3 and inserts the information which is input into the insertion comment field 1327 to the graph comment box 1318 or the explanation field 1319. Accordingly character information etc. which corresponds to the content of the graph can be acquired from the article database server 3 based on the time information which is a parameter information in X-axis direction of the plot area 1310*a* which is the positional information of the clicked graph. Further, the core add-in section 17 can acquire the article title information 32 and the article body information 37 to which the year/month/day information 33 is added as an attribute information, in association with the time information of the graph by the assistance of the character information acquiring section 172. Therefore, the character information which matches the time information of the graph can be acquired and inserted into the graph comment box 1318 or the explanation field 1319.

In the material creation support system 1A of the first embodiment, the character information acquiring section 172 can further acquires, in addition to the year/month/day information, an article title information 32 and the article body information 37 with a predetermined attribute information (title information 32, category information 34, keyword information 35) being able to setup precise conditions for acquiring the article information 31 and the article body information.

In the material creation support system 1A of the first embodiment, a title information of the past newspaper articles or the past magazine articles forms an article information 31 and is stored on the article database server 3. A published date of the newspaper or the magazine on which the article appeared forms one of the attribute information, and at least either one of the category information 34 of the newspaper or the magazine article which are the source of the title information 32 or a keyword information 35 of the title information 32, forms a predetermined attribute information so that a character information can be formed based on the past news information.

In the material creation support system 1A of the first embodiment, frequently-used numerical value is previously sent from the economic statistics database server 5 to the storage data base 142 and stored on the storage database 142. The economic statistics database control section 18 can supply the numerical value stored on the storage database 142 according to the demands from the core add-in section 17 so that the number of access from the material creation support unit 1 to the economic statistics database server 5 can be reduced.

In the material creation support system 1A of the embodiment 1, the material creation section 16 creates a material with a graph created by the core add-in section 17 incorporated as content information so that a process of incorporating the graph into the content can be performed by the operation of the material creation section 16 without using manual labor.

Next, the second embodiment of the material creation support system will be explained.

Figure 9:
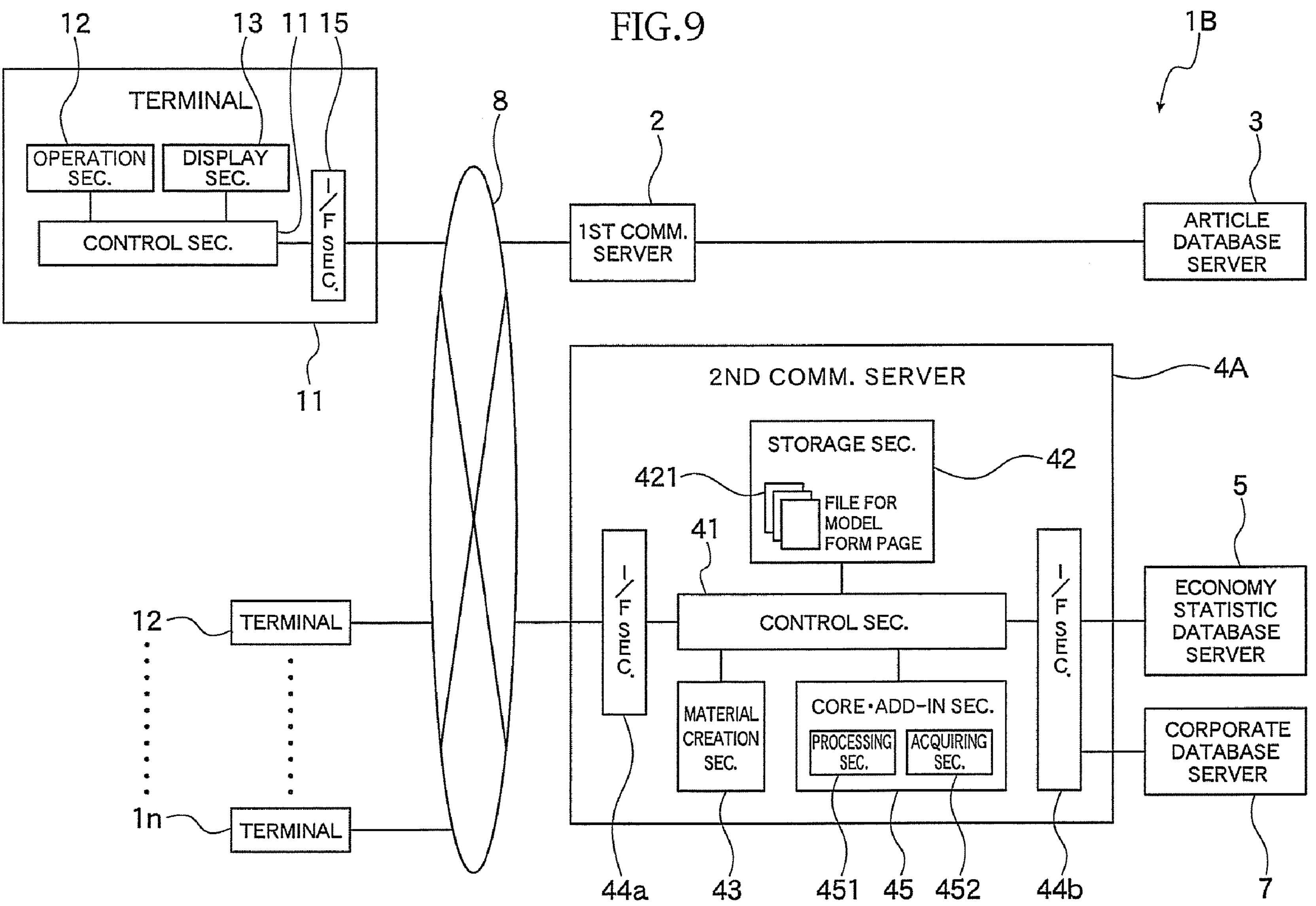
FIG. 9 is a system and block diagrams of a second embodiment of the present material creation support system.

FIG. 9 is a system block diagram and a functional diagram of the material creation support system of the second embodiment. As shown in FIG. 9, the material creation support system 1B of the second embodiment forms a client server system and comprises N≧1) client terminals $\mathbf{1}_1$~$\mathbf{1}_n$, a first communication server 2, an article database server 3, a second communication server 4A as the material creation support unit, an economic statistics database server 5, a corporate database server 7 and the internet 8.

Each of the client terminals $\mathbf{1}_1$~$\mathbf{1}_n$ comprises a computer terminals having a communication function and usable under network environment such as a personal computers, mobile computers, PDAs (Personal Digital Assistance), a wireless communication etc. Each of the client terminals $\mathbf{1}_1$~$\mathbf{1}_n$ has, as like as a client terminal $\mathbf{1}_1$ as shown in FIG. 9, a control section 11, an operation section 12, a display section 13 and an interface section (I/F section) 15. Here, the client terminals $\mathbf{1}_1$~$\mathbf{1}_n$ have the same function so that it will be described as a client terminal $\mathbf{1}_1$ hereafter.

The second communication server 4A comprises a control section 41, a storage section 42, a material creation section 43, interface sections (I/F sections) 44*a*, 44*b*, and a core add-in section 45 having a graph information processing section 451 and a character information acquiring section 452. In the storage section 42, a file for model form 421 is stored. Each functional block of the second communication server 4 is the same functional block corresponding to the material creation support unit 1 of the material creation support system 1A of the first embodiment. To the second communication server 4A, an economic statistics database server 5 and a corporate database server 7 are connected through the interface section 44*b*. Other configurations are the same as that of the first embodiment shown in FIGS. 1 to 9.

Next, functions and operations of the second embodiment will be explained.

In the material creation support system 1B of the second embodiment, the material creation section 43 of the second communication server section 4 and the core add-in section 45 having the graph information processing section 451 and the character information acquiring section 452 are operated through the internet 8 with the operation of the operation section 12 of the client terminal $\mathbf{1}_1$. And the processing results in the material creation section 43 and the core add-in section 45 are displayed on the display section 13 through the internet 8. These operations are different from the first embodiment. However, the operational procedures are the same as the material creation support system 1A of the first embodiment described in FIGS. 7A, 7B and 8.

As shown above, in the material creation support system 1B of the second embodiment, the second communication server 4A which has a data communication ability under the network environment has a function of the material creation support unit. The second communication server 4A has a data communication function under the network environment and information from the article database server 3, the economic statistics database server 5 and the corporate database server 7 is supplied to the second communication server 4 so that the function and operation of the material creation support unit can be performed at the client side server system.

In the embodiment mentioned above, the material creation support systems 1A, 1B, and material creating units 1, 4A are used for creating the presentation material for promoting proposed goods such as bonds and stocks, but are not limited to such applications. The present invention can be utilized to create all presentation materials of all goods other than the bonds and stocks and can be applied to create presentation materials used for meetings of research activities.

In the embodiment mentioned above, the horizontal axis (X-axis) is used as "one axis" showing time information as a parameter, but the "one axis" of a graph can be used as a longitudinal axis.

The embodiments mentioned above are only a few examples, and the present invention is not limited to these embodiments.

REFERENCE NUMERALS

1A, 1B Material creation support system
4A Material creation support device
3 Article database server
5 Economic statistics database server
16, 43 Material creation section
17, 45 Core add-in section
18 Economic statistics data control section
32 Title information
33 Year/month/day information
34 Category information
35 Key word information
142 Storage database
171, 451 Graph information processing section
172, 452 Character information acquiring section
1310*a* Plot area
1318 Graph comment box
1319 Explanation field

The invention claimed is:

1. A material creation support device which comprises:

a graph creation section which creates a graph, in which one of axes as a time axis indicates time information as a parameter, based on numeric value information comprising a plurality of numeric values, and which displays the graph on a plot area;

an operation section which supports selection of any position in the displayed plot area including a plotted position on the graph or an un-plotted position on the displayed plot area;

a time information acquisition section which detects a coordinate of the time axis corresponding to the selected position on the plot area, and acquires the time information according to the detected coordinate;

a character information acquisition section which acquires character information whose one of attribute information related to time matches the acquired time information, from an external character data storage device which stores a plurality of character information containing predetermined time information including year/month/day information as the one of attribute information related to time; and a character information insertion section which inserts the character information acquired from the external character data storage section to the plot area or a vicinity of the plot area and displays the inserted character information together with the graph.

2. The material creation support device according to claim 1, wherein the character information acquisition section acquires the character information based on another predetermined attribute information in addition to the one of attribute information.

3. The material creation support device according to claim 2, wherein the character information stored on the character data storage section is at least one of the analysis information selected from one or more of a title information of a past newspaper article, a title information of a past magazine article, economy, business climate or market conditions;

the one of attribute information is an issued date year/month/day information of the newspaper or magazine on which the article appeared; and the predetermined attribute information is at least either one of the category information or the key word information of the newspaper or the magazine article which is a source of the title information.

4. The material creation support device according to claim 1, wherein the device further comprises:

a numeric value data-storage section which stores specific numeric value information; and a data controlling section which accesses the numeric value data-storage section, reads the specific numeric value information from the numeric value data-storage section, stores the read specific numeric value information to a specific storage region and supplies the stored numeric value information to the graph creation section responding to a demand transmitted from the graph creation section when the graph creation section creates the graph.

5. The material creation support device according to claim 1, wherein the device further comprises a material creation section which creates a material containing the graph created by the graph creation section as content information.

6. A material creation support system comprising:

a material creation support device according to claim 1 which is capable of communicating data under a network environment;

a character data storage device which stores a plurality of character information to which a predetermined year/month/day information is attached as one of attribute information, and which supplies the character information to the material creation support device; and economic statistics data storage device which stores numeric value information of a past economic or business trend and which supplies the numeric value information to the material creation support device.

7. A computer-readable storage medium having recorded thereon a computer program for making a computer operate as the material creation support device according to claim 1.

* * * * *